(12) United States Patent
Nakanishi et al.

(10) Patent No.: US 11,074,877 B1
(45) Date of Patent: Jul. 27, 2021

(54) MULTI-PANEL LIQUID CRYSTAL DISPLAY DEVICE AND METHOD FOR DISPLAYING IMAGE THEREIN

(71) Applicants: Panasonic Liquid Crystal Display Co., Ltd., Himeji (JP); Pasona Knowledge Partner Inc., Osaka (JP)

(72) Inventors: Hideyuki Nakanishi, Osaka (JP); Katsuhiro Kikuchi, Osaka (JP); Takenobu Nishiguchi, Nara (JP); Tatsuo Itoman, Osaka (JP)

(73) Assignees: PANASONIC LIQUID CRYSTAL DISPLAY CO., LTD., Hyogo (JP); PASONA KNOWLEDGE PARTNER INC., Osaka (JP)

( * ) Notice: Subject to any disclaimer, the term of this patent is extended or adjusted under 35 U.S.C. 154(b) by 0 days.

(21) Appl. No.: 16/750,830

(22) Filed: Jan. 23, 2020

(51) Int. Cl.
   *G09G 3/36* (2006.01)
   *G06T 5/00* (2006.01)
   *G06T 5/20* (2006.01)
   *G06T 5/50* (2006.01)

(52) U.S. Cl.
   CPC ........... *G09G 3/3607* (2013.01); *G06T 5/002* (2013.01); *G06T 5/20* (2013.01); *G06T 5/50* (2013.01); *G09G 2300/023* (2013.01); *G09G 2320/0252* (2013.01); *G09G 2320/0271* (2013.01); *G09G 2340/16* (2013.01); *G09G 2360/12* (2013.01)

(58) Field of Classification Search
   None
   See application file for complete search history.

(56) References Cited

U.S. PATENT DOCUMENTS

| 2002/0140652 | A1* | 10/2002 | Suzuki | G09G 3/3611 345/87 |
|---|---|---|---|---|
| 2008/0291298 | A1* | 11/2008 | Kim | H04N 5/144 348/241 |
| 2012/0287380 | A1* | 11/2012 | Hagiwara | G02F 1/133514 349/97 |
| 2018/0059465 | A1* | 3/2018 | Koudo | G02F 1/13471 |
| 2018/0286325 | A1 | 10/2018 | Koudo et al. | |

\* cited by examiner

*Primary Examiner* — Tize Ma
(74) *Attorney, Agent, or Firm* — Hamre, Schumann, Mueller & Larson, P.C.

(57) ABSTRACT

A liquid crystal (LC) display device includes a first display panel, a second display panel, and an image processor. The image processor generates first image data and second image data that correspond to a first image and a second image for display on the first display panel and the second display panel, respectively. The image processor includes a first image data decision unit that decides the first image data, a filter that decides a correction factor, and a second image data decision unit that decides the second image data based on smoothed image data and the correction factor. A method for displaying an image in a LC display device with a first display panel and a second display panel includes determining first image data based on smoothed input image data, and determining second image data based on the smoothed input image data and a correction factor.

12 Claims, 5 Drawing Sheets

MULTI-PANEL LIQUID CRYSTAL DISPLAY DEVICE AND METHOD FOR DISPLAYING IMAGE THEREIN

FIELD

This disclosure relates to liquid crystal display devices that utilize two or more liquid crystal display panels.

BACKGROUND

A liquid crystal ("LC") display device display provides a plurality of pixels that form the displayed image. A LC display device can include multiple stacked LC display panels that form the pixels in the displayed image. Each LC display panel includes pixels that filter light. An LC display panel can provide filtered light to another LC display panel that further filters the light such that the desired image is formed. Each set of corresponding pixels in the LC display panels filters light to form the pixels in the displayed image with properties (e.g., color, brightness, saturation) that match the desired image.

SUMMARY

A LC display device includes a first display panel, a second display panel opposed to the first display panel, and an image processor. The first display panel displays a first image and the second display panel displays a second image. The image processor generates first image data corresponding to the first image and second image data corresponding to the second image based on an input video data.

In an embodiment, the image processor includes a smoothing processor, a first image data decision unit, a filter, and a second image data decision unit. The smoothing processor performs smoothing processing on input image data of the input video data. The first image data decision unit is operatively connected to the smoothing processor and decides the first image data based on the image data subjected to the smoothing processing. The filter is operatively connected to the first image data decision unit and decides a correction factor for the second image data based on the first image data. The second image data decision unit is operatively connected to the smoothing processor and the filter. The second image data decision unit decides the second image data based on the image data subjected to the smoothing processing and the correction factor from the filter In an embodiment, a method for displaying an image in a LC display device having first and second display panels includes smoothing input image data of an input video data, determining first image data based on the smoothed input image data, determining a correction factor for second image data based on the first image data. The method further includes determining the second image data, and generating a first image displayable on the first display panel and a second image displayable on the second display panel using the first image data and the second image data.

The first image data is based on the smoothed input image data. The second image data is based on the smoothed input image data and the correction factor. The method further includes receiving the input video data.

BRIEF DESCRIPTION OF THE DRAWINGS

Both described and other features, aspects, and advantages of a liquid crystal display device and a method of displaying an image in a liquid crystal display device will be better understood with the following drawings.

Like reference characters refer to similar features.

DETAILED DESCRIPTION

A LC display device can include at least a two LC display panels. Each LC display panel includes liquid crystal and pixels with pixel electrodes that manipulate portions of the liquid crystal to control an amount of the light that is filtered by each respective pixel. For example, the luminescence of a pixel in the displayed image is a product of the filtering provided by a pixel in the rear display panel ("pixel A") and the filtering provided by a pixel in the front display panel ("pixel B"). In other words, pixel A only allows a first percentage of the light passing through pixel A to be emitted from the rear display panel, and the pixel B only allows a second percentage of the filtered light reaching pixel B to be emitted from the front display panel (e.g., luminescence-≈initial brightness·(first percentage)·(second percentage)).

The response speed of the liquid crystal molecules in the two LC display panels can be different. When the LC display is directed to change its displayed image, it can take longer for the slower LC display panel to reach its new filtering percentage than for the faster LC display panel to reach its new filtering value. For example, the faster LC panel may decrease its filtering faster than the slower LC panel can increase its filtering for a pixel in a displayed image. This can cause a temporary increase in the overall luminescence of the displayed pixel until the filtering for both panels reaches the new filtering values. It has been found that even slight differences in the response times of the liquid crystal in the two LC display panels can result in flickering and/or luminance unevenness when the LC display changes images. For example, response times may be different between panels due to having different liquid crystal components (e.g., a negative type, a positive type), and/or operating at different temperatures. The panel(s) closer to the light source can operate at higher temperatures due to the energy generated by the light source.

Embodiments disclosed herein are configured to advantageously correct the image to be displayed by one display panel based on the image to be displayed in a different display panel. In an embodiment, the image correction accounts for and helps minimize overall brightness differences caused by one of the display panels having a faster response time.

Figure 1:
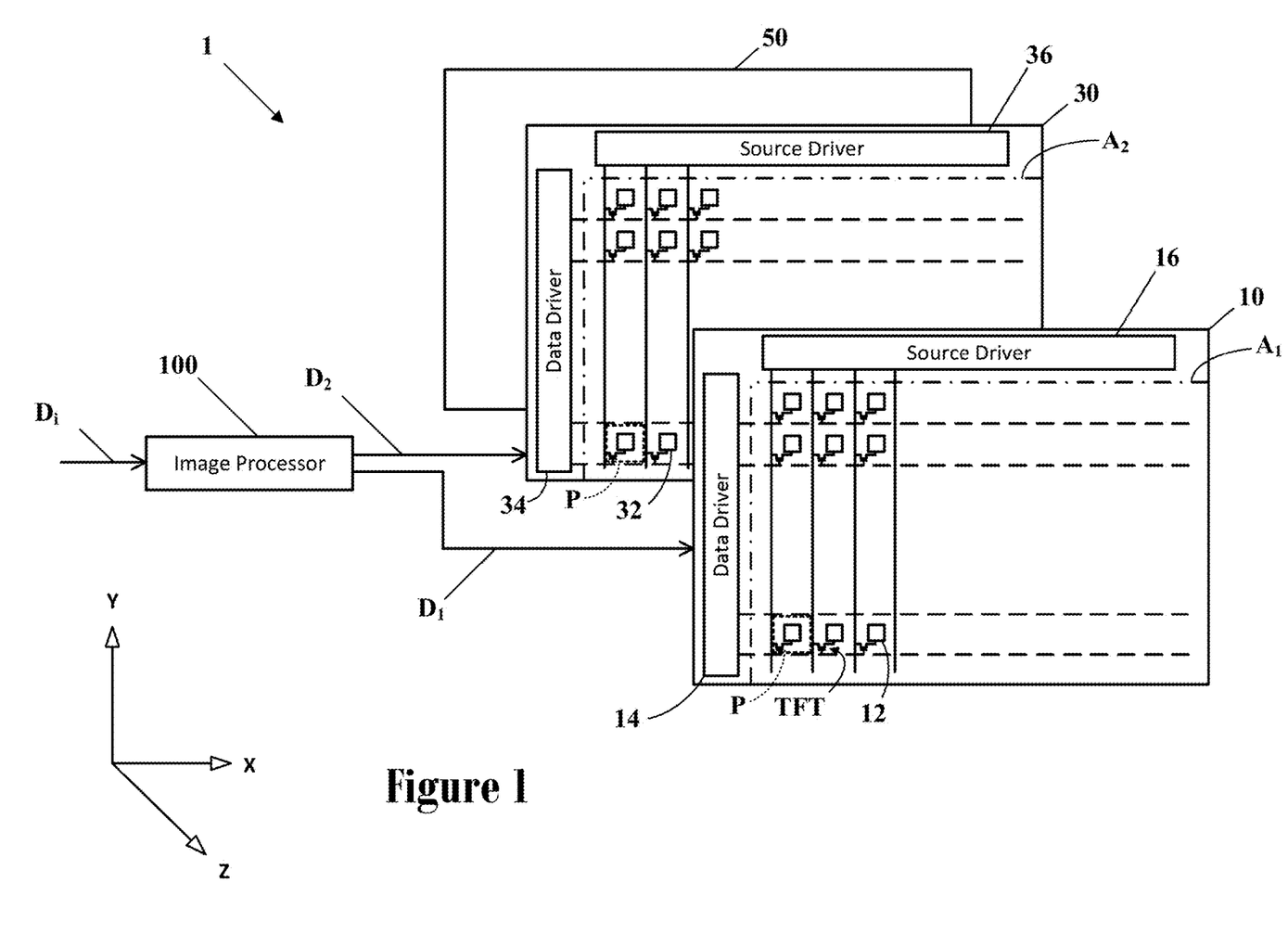
FIG. 1 is a schematic view of an embodiment of a liquid crystal display device.

FIG. 1 shows a schematic view of a LC display device 1. The LC display device 1 is configured to display a desired image. The LC display device 1 includes a first display panel 10, a second display panel 30, a light source 50, and an image processor 100. The first display panel 10 and the second display panel 30 are each LC display panels. The first display panel 10, the second display panel 30, and the light source 50 are in a stacked configuration in the viewing direction (e.g., in negative Z direction).

The light source 50 provides light to the second display panel 30. The second display panel 30 filters the light from the light source 50 and provides the filtered light to the first display panel 10. The first display panel 10 further filters the filtered light from the second display panel 30. The light filtered by the first display panel 10 and second display panel 30 shows the desired image. The display panels 10, 30 are configured to filter the light from the light source 50 to display a desired image. Operation of the display panels 10, 30 is discussed in more detail below.

In an embodiment, the light source 50 is backlight unit. The light source 50 can include, for example, lamp(s), LED(s), light guide plate, etc. for generating light. The light source 50 can provide unfiltered light to the second display panel 30. In an embodiment, the light source 50 can provide diffused light to the second display panel 30.

Each of the display panels 10, 30 includes a display area $A_1$, $A_2$ containing pixels P that are arranged in a matrix with rows (e.g., in the X direction) and columns (e.g., in the Y direction). Each pixel P includes a thin film transistor ("TFT") and a pixel electrode 12, 32. Each display panel 10, 30 includes a gate driver (i.e., data driver) 14, 34 and a source driver 16, 36 that individually electrically controls the pixel electrodes 12, 32 in their respective display panel via the TFTs. In each display panel 10, 30, the pair of drivers 14/34, 16/36 controls the amount of light filtered by each pixel P so that the display panels 10, 30 filter and display the correct image.

The desired image for the LC display device 1 to display may be referred to as the input image. During operation, the image processor 100 receives input image data $D_i$. The input image data $D_i$ corresponds to the input image to be displayed by the LC display device 1. The image processor 100 generates first image data $D_1$ and second image data $D_2$ based on the input image data $D_i$. The first image data $D_1$ is used to display a first image on the first display panel 10, and the second image data $D_2$ is used to display a second image on the second display panel 30. For example, the gate driver 34 and source driver 36 in the second display panel 30 (shown in FIG. 1) use the second image data $D_2$ to display the second image on the second display panel 30. The light from the second display 30 is provided to the first display 10 and is filtered by the first display 10 to display the first image. The first image is configured to be the input image in this embodiment.

In an embodiment, the first image data $D_1$ includes respective filtering values for the pixels P in the first display panel 10 for displaying the first image. In an embodiment, the second image data $D_2$ includes filtering values for each pixel P in the second display panel 30 to display the second image. For example, a filtering value can be the amount of light to be filtered by a pixel and/or a voltage for the corresponding pixel electrode 12, 32 to provide the intended amount of light filtering. The first image data $D_1$ and second image data $D_2$ are provided to their respective display panels 10, 30. The drivers 14, 16, 34, 36 control the pixels P in the panels according to the first and second image data $D_1$, $D_2$.

The pixels P in the second display panel 30 are controlled to filter the light from the light source 50 and display the second image. The pixels P in the first display panel 10 are controlled to filter the light from the second display panel 30 and display the first image. Light is filtered by the pixels P in the second display panel 30 and the pixels P in the first display panel 10 to display the desired image. The configuration of the image processor 100 is described in more detail below. In some embodiments, the first display panel 10 is referred to as a main panel and the second display panel 30 is referred to as a sub-panel.

Figure 2:
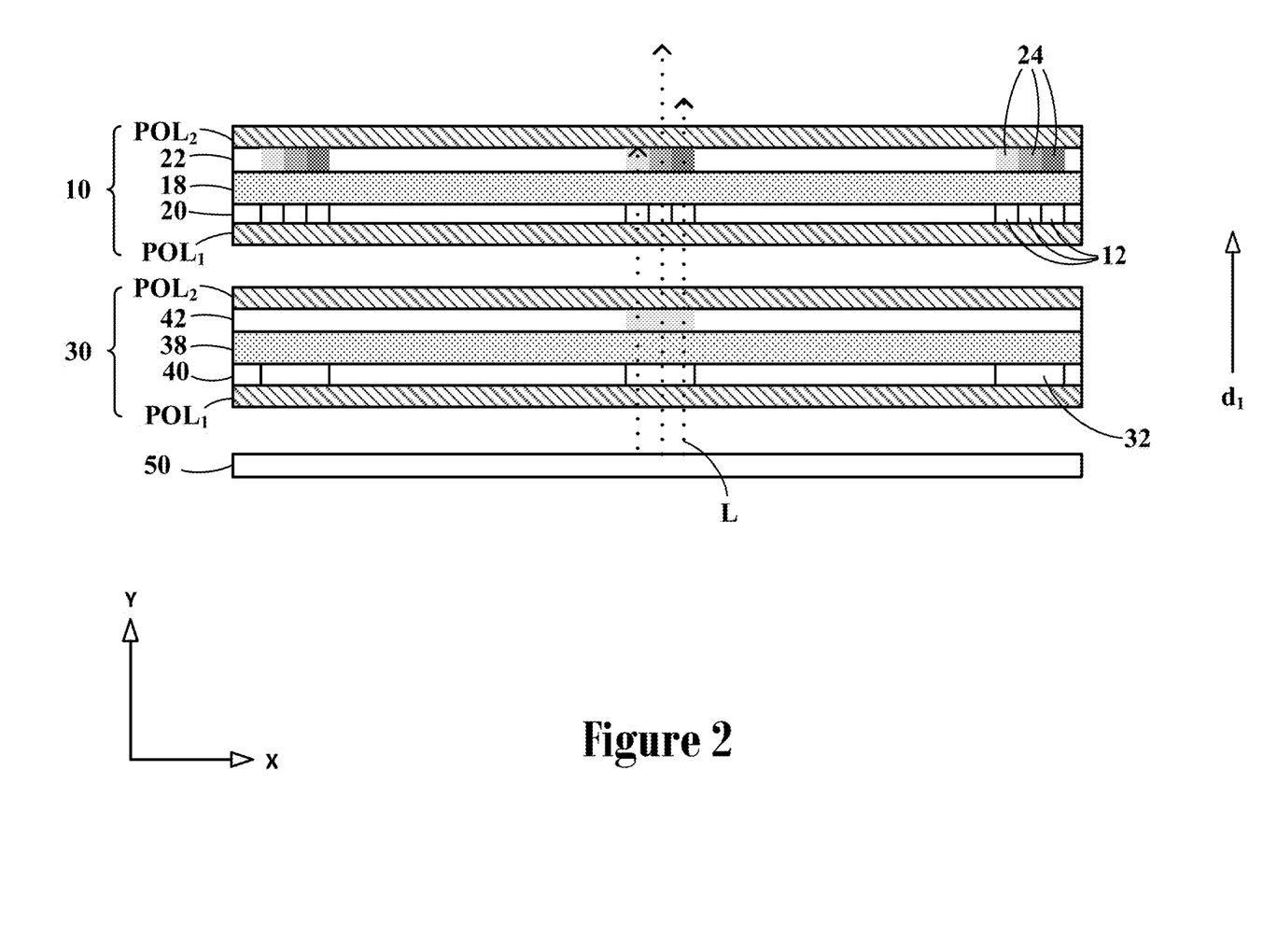
FIG. 2 is a schematic cross-sectional view of the first and second display panels and the light source of FIG. 2, according to an embodiment.

The display panels 10, 30 are composed of a series of layered components. FIG. 2 is a schematic cross-sectional view of the display panels 10, 30 and the light source 50. The second display panel 30 is opposed to the first display panel 10. The second display panel 30 is located between first display panel 10 and the light source 50 in the thickness direction $d_t$ of the LC display device 1 (e.g., in Z direction in FIG. 1). Light (e.g., light L) emitted from light source 50 passes through and is filtered by the second display panel 30 and then the first display panel 10.

As shown in FIG. 2, each display panel 10, 30 includes a layer of liquid crystal 18/38 sandwiched between a first substrate 20/40 and a second substrate 22/42. In each display panel 10, 30, the liquid crystal layer 18, 38 and the pair of substrates 20/22, 40/42 are sandwiched by a pair of polarizers $POL_1$, $POL_2$. The first substrates 20, 40 include the pixel electrodes 12/32 of their respective display panel 10, 30. The charge of the pixel electrodes 12, 32 controls how the portion of the liquid crystal layer 18, 38 along said pixel electrode 12, 32 changes the orientation of the light passing therethrough. Thus, the charge of each pixel electrode 12, 32 can control how much light passes through the second polarizer $POL_2$ in each display panel 10, 30.

In an embodiment, the second substrate 22 in the first display panel 10 can include filters 24. A filter 24 can be a specific color (e.g., green, red, blue, yellow, white, etc.). Each filter 24 has a corresponding pixel electrode 12 that controls the amount of its light that passes through the second polarizer $POL_2$. In an embodiment, the second substrate 22 in the first display panel 10 is a color substrate with colored filters 24. In an embodiment, the color filters 24 are arranged in repeating sets of colors (e.g., repeating sets of three colors, repeating sets of four colors, etc.) and the light passing through the color filters 24 (e.g., the light L) in each are configured to mix and form a single pixel of light with a desired color. In an embodiment, the second substrates 22, 42 include black matrix (not shown) to prevent light from mixing between pixels within the second substrates 22, 42. In some embodiments, the LC display device 1 is a monochrome display and does not include the filters 22.

The pixels in the second display panel 30 provide light for three of the pixels in the first display panel 10. The display area $A_1$ of first display panel 10 has triple the pixel density of the display area $A_2$ of the second display panel 30. It should be appreciated that the pixels in the second display panel 30 may be configured to provide light to a different number of pixels than three. For example, the pixels in the second display panel 30 in an embodiment may be configured to each provide light to one pixel in the first display panel 10. In such an embodiment, the display area $A_1$ of first display panel 10 and the display area $A_2$ of the second display panel 30 have at or about the same pixel density.

The display panels 10, 30 and the light source 50 are shown in FIG. 2 as spaced apart. However, it should be appreciated that panels 10, 30 and light source 50 are attached to each other in various embodiments. In an embodiment, the display panels 10, 30 can be supported and/or mounted in a common frame structure. It should be understood the that display panels 10, 30 in an embodiment may include additional components beyond those shown, such as for example, optical film(s) (brightness enhancement film, light distributing film, etc.), protection film(s), adhesive(s), etc.

In an embodiment, the second display panel 30 can provide non-colored filtering, i.e., contrast filtering, while the first display panel 10 provides color filtering. The second display panel 30 can advantageously provide higher contrasts than can be achieved by the first display panel 10 by itself.

Figure 3:
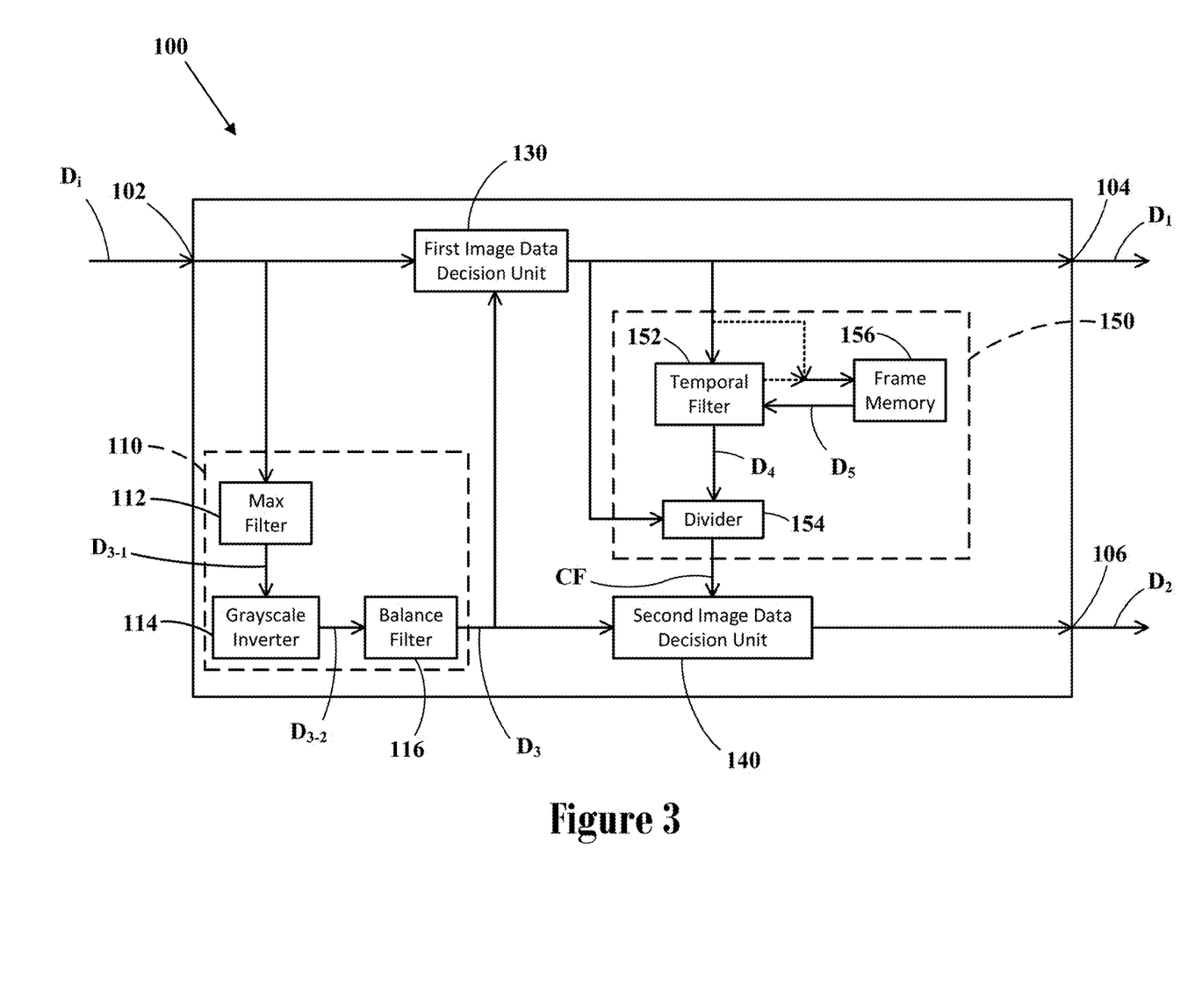
FIG. 3 is a schematic view of an image processor in the liquid crystal display device of FIG. 1, according to an embodiment.

FIG. 3 is a schematic view of an embodiment of the image processor 100 of the LC display device 1. The image processor 100 receives the input image data $D_i$ and generates the first image data $D_1$ and the second image data $D_2$ based on the input image data $D_i$. The first image data $D_1$ corresponds to the first image to be displayed by the first display panel 10 (shown in FIGS. 1 and 2). The second image data $D_2$ corresponds to the second image to be displayed by the second display panel 30 (shown in FIGS. 1 and 2).

As shown in FIG. 3, the image processor 100 includes a smoothing processor 110, a first image data decision unit 130, a second image processing unit 140, and a filter 150. In an embodiment, the image processor 100 has an input terminal 102 for the signal for the input image data $D_i$ and output terminals 104, 106 for the signals for the first and second image data $D_1$, $D_2$, respectively. In such an embodiment, the first image data decision unit 130 and the smoothing processor 110 are electrically connected to the input terminal 102, the first image data decision unit 130 can be electrically connected to the output terminal 104, and/or the second image data decision unit 140 can be electrically connected to the other output terminal 106.

The smoothing processor 110 is configured to perform smoothing processing on the input image data $D_i$ to generate smoothed input image data $D_3$. The smoothing processor receives the input image data $D_i$ and generates the smoothed image data $D_3$. The smoothed image data $D_3$ is the input data $D_i$ subjected to the smoothing processing.

The smoothing processor 110 includes a max filter 112, a grayscale inverter 114, and a balance filter 116. The max filter 112 performs max filtering on the input image data $D_i$ to generate max filtered image data $D_{3-1}$. Max filtering is well known in the field of image filtering and the max filter 112 employs max filtering. Max filtering is configured to help remove noise from an image. The image data for a color image includes a set of color values for each pixel. For example, the input image data $D_i$ includes an R value, a G value, and a B value for each pixel in the input image. In an embodiment, max filtering sets the maximum values for each of the color values in each pixel based on the maximum value of the color values in its neighboring pixels.

The grayscale inverter 114 performs grayscale inversion on the max filtered image data $D_{3-1}$ to generate grayscale image data $D_{3-2}$. The grayscale image data $D_{3-2}$ corresponds to a modified grayscale image of the input image. Grayscale inversion is well known in the field of image filtering, and the grayscale inverter 114 employs grayscale inversion. For example, the grayscale inverter 114 may utilize a grayscale table for converting the color values and/or the contrast value of each pixel to a corresponding grayscale value. In an embodiment, the grayscale inverter 114 may be configured to account for the gamma characteristics of one or both of the display panels 10, 30.

The balance filter 116 performs mean filtering on the grayscale image data $D_{3-2}$ to generate the smoothed image data $D_3$. Mean filtering is known in the field of image filtering, and the balance filter 116 employs mean filtering. Mean filtering helps remove noise from the grayscale image. For example, mean filtering adjusts grayscale values for neighboring pixels to remove sudden value changes across neighboring pixels. In an embodiment, mean filtering can be gaussian filtering that adjusts grayscale values relative to nearby pixels so that change between neighboring values does not exceed a normal distribution.

The max filter 112 and the balance filter 116 are examples of smoothing filters. It should be appreciated that other embodiments of the smoothing processor 110 may include different smoothing filters than the max filter 112 and the balance filter 116. In an embodiment, the smoothing processor 110 may include the grayscale inverter 114 and one or more smoothing filters. In an embodiment, the timing at which the grayscale conversion occurs may be different. For example, the smoothing processor 100 in an embodiment may apply the grayscale conversion before, between, or after applying the smoothing filter(s).

The first image data decision unit 130 is configured to determine the first image data $D_1$ for the first display panel 10 (shown in FIGS. 1 and 2). As shown in FIG. 3, the first image data decision unit 130 receives the input image data $D_i$ and the smoothed image data $D_3$ and generates the first image data $D_1$. The first image data decision unit 130 is operatively connected to the smoothing processor 110. The first image data decision unit 130 decides the first image data $D_1$ based on the input image data $D_i$ and the smoothed image data $D_3$.

The liquid crystal molecules in the liquid crystal layer 18 of the first display panel 10 (shown in FIG. 2) can have different response time than the liquid crystal molecules of the liquid crystal layer 38 of the second display panel 30 (shown in FIG. 2). For example, the liquid crystal layer 38 of the second display panel 30 in an embodiment has a faster response time than the liquid crystal layer 18 in the first display panel 10. The response speeds of the first and second display panels 10, 30 are based on the liquid crystal in each of the first and second display panels 10, 30. As discussed above, this difference in response times can cause an excessive increase in the luminosity of a pixel in the displayed image, leading to flickering and/or luminance unevenness in the display image.

Returning to FIG. 3, the filter 150 decides and generates a correction factor CF for the second image data $D_2$ based on the first image data $D_1$. As shown in FIG. 3, the filter 150 receives the first image data $D_1$ decided by the first image data decision unit 130. The filter 150 is operatively connected to the first image data decision unit 130. The correction factor CF adjusts how the liquid crystal 38 is driven to compensate for the different response times of the liquid crystal 18, 38 in the first and second display panels 10, 30. The configuration and operation of the filter 150 is discussed in the more detail below.

The second image data decision unit 140 is configured to determine the second image data $D_2$ for the second display panel 30 (shown in FIGS. 1 and 2). As shown in FIG. 3, the second image data decision unit 140 receives the smoothed image data $D_3$ and the correction factor CF decided by the filter 150. The second image data decision unit 140 is operatively connected to the smoothing processor 110 and the filter 150.

The second image data decision unit 140 decides the second image data $D_2$ based on the smoothed image data $D_3$ and the correction factor CF. For example, the second image data decision unit 140 may determine initial image data based on the smoothed input image data $D_3$ and then modify the initial image data based on the correction factor CF. In another embodiment, the determination of the second image data $D_2$ simply incorporates the correction factor CF such that the second image data decision unit 140 uses the smoothed image data $D_3$ and the correction factor CF simultaneously to determine the second image data $D_2$.

The correction factor CF is configured to modify how operation of the liquid crystal 38 in the second display device 30 to account for response time differences between the liquid crystal 18, 38 in the display panels 10, 30. In an embodiment, the correction factor CF increases or decreases the values in the smoothed image data $D_3$ to compensate for the display panels 10, 30 having different response times.

In an embodiment, the liquid crystal 38 in the second display panel 30 (shown in FIG. 2) has a faster response time than the liquid crystal layer 18 in the first display panel 10 (shown in FIG. 2). In such an embodiment, the filter 150 can act as an underdrive with the correction factor CF decreasing a rate of changing speeds between a current and a previous frames in the generated second image data $D_2$ so that the faster liquid crystal layer 38 is operated to respond more slowly.

In another embodiment, the liquid crystal 38 in the second display panel 30 has a slower response time than the liquid crystal 18 in the first display panel 10. In such an embodiment, the filter 150 can act as an overdrive by the correction factor CF increasing a rate of changing speeds between a current and a previous frames in the generated second image data $D_2$ such that the slower liquid crystal 38 is operated to respond more quickly.

The correction factor CF applies a correction rate to the operation of the second display panel 30 to adjust for the difference in response times of the liquid crystal 18, 38. The correction factor CF is configured to affect how the second display panel 30 reaches the second image. For example, the correction factor CF might cause a faster second display panel 30 to respond 10% slower so as to provide the desired second image slower.

In an embodiment, the filter 150 includes a temporal filter 152, a divider 154, and a frame memory 156 for calculating the correction factor CF. In some embodiments, the image processor 100 is formed of logic circuits and memory(s) without a processor. In such embodiments, the temporal filter 152 and divider 154 are formed by logic circuits. In other embodiments, the image processor 100 may include a processor. In such embodiments, the temporal filter 152 may utilize the same processor as the first image data decision unit 130 and/or the second image data decision unit 140.

The temporal filter 152 receives the first image data $D_1$ and generates a grayscale of modified image data $D_4$. The temporal filter 152 generates the modified image data $D_4$ by comparing the first image data in a current frame (e.g., $D_1$ at $t_n$) with one of the first image data in a previous frame (e.g., $D_1$ at $t_{n-1}$) or data calculated in the temporal filter 152 in a previous frame. For example, the temporal filter 152 in an embodiment decides the modified image data $D_4$ by comparing the first image data in a current frame (e.g., $D_1$ at $t_n$) and the first image data in a previous frame (e.g., $D_1$ at $t_{n-1}$). For example, the temporal filter 152 in an embodiment decides the modified image data $D_4$ by comparing the first image data in a current frame (e.g., $D_1$ at $t_n$) and data calculated in the temporal filter 152 in a previous frame.

The divider 154 receives the first image data $D_1$ and modified image data $D_4$ and generates the correction factor CF. The divider 154 calculates a correction amount for the correction amount by dividing values in modified image data $D_4$ by a values in the first image data $D_1$ (i.e., values in modified image data $D_4$/values in the first image data $D_1$). In an embodiment, the values are grayscale values.

The frame memory 156 stores data used and/or data calculated by the temporal filter 152. The frame memory 156 is a non-transitory memory. In an embodiment, the data stored in the frame memory 156 includes values of modified image data $D_4$ used in previous frame(s) (e.g., $D_4$ at $t_{n-1}$, $D_4$ at $t_{n-2}$, etc.) and/or first image data in previous frame(s) (e.g., $D_1$ at $t_{n-1}$, $D_4$ at $t_{n-2}$, etc.). In an embodiment, the data stored in the frame memory 156 includes calculation(s) by the temporal filter 152 for generating the modified image data $D_4$ in previous frame(s). The frame memory 156 provides image data $D_5$ to the temporal filter 152 that is the modified image data $D_4$ used in a previous frame (e.g., $D_4$ at $t_{n-1}$, $D_4$ at $t_{n-2}$, etc.), first image data in a previous frame (e.g., $D_1$ at $t_{n-1}$, $D_4$ at $t_{n-2}$, etc.), and/or calculation data that was performed in the temporal filter 152 in a previous frame.

The modified image data $D_4$ consists of values ("output gradation values"). The filter 150 determines an output gradation value based on a relationship between an input gradation value (e.g., a value in the first image data $D_1$) in a current frame and a corrected gradation value in a previous frame (e.g., a value in the modified image data $D_4$ in a previous frame). For example, the corrected gradation values of the second image data can be calculated in the temporal filter 152 based on first image data $D_1$ and the modified image data $D_4$ in the previous frame that is stored in the frame memory 156.

In an embodiment, an output gradation value ($V_{ON}^n$) is determined for each pixel utilizing the following relationship (1):

$$V_{ON}^n = (V_{IN}^n - V_{ON}^{n-1}) \cdot k + V_{on}^{n+1} \quad (1)$$

$V_{IN}^n$=an input gradation value of the first image data $D_1$ in the current frame
$V_{ON}^{n-1}$=a corrected gradation value in the previous frame
$V_{ON}^n$=a corrected gradation value in the current frame
k=time constant The time constant (k) is predetermined value based on the specific relative response speeds of the two display panels 10, 30. For example, the time constant (k) is greater than 1 (i.e., k>1) if the first display panel 10 has a faster response speed than the second display panel 30, and the time constant (k) is less than 1 (i.e., k<1) if the first display panel 10 has a slower response speed then the second display panel 30.

In an embodiment, the filter 150 may utilizes a lookup table instead of the above relationship to determine output gradation values. For example, the lookup table may be stored in the frame memory 156 or the filter 150 may include a separate memory for storing the lookup table.

Figure 4:
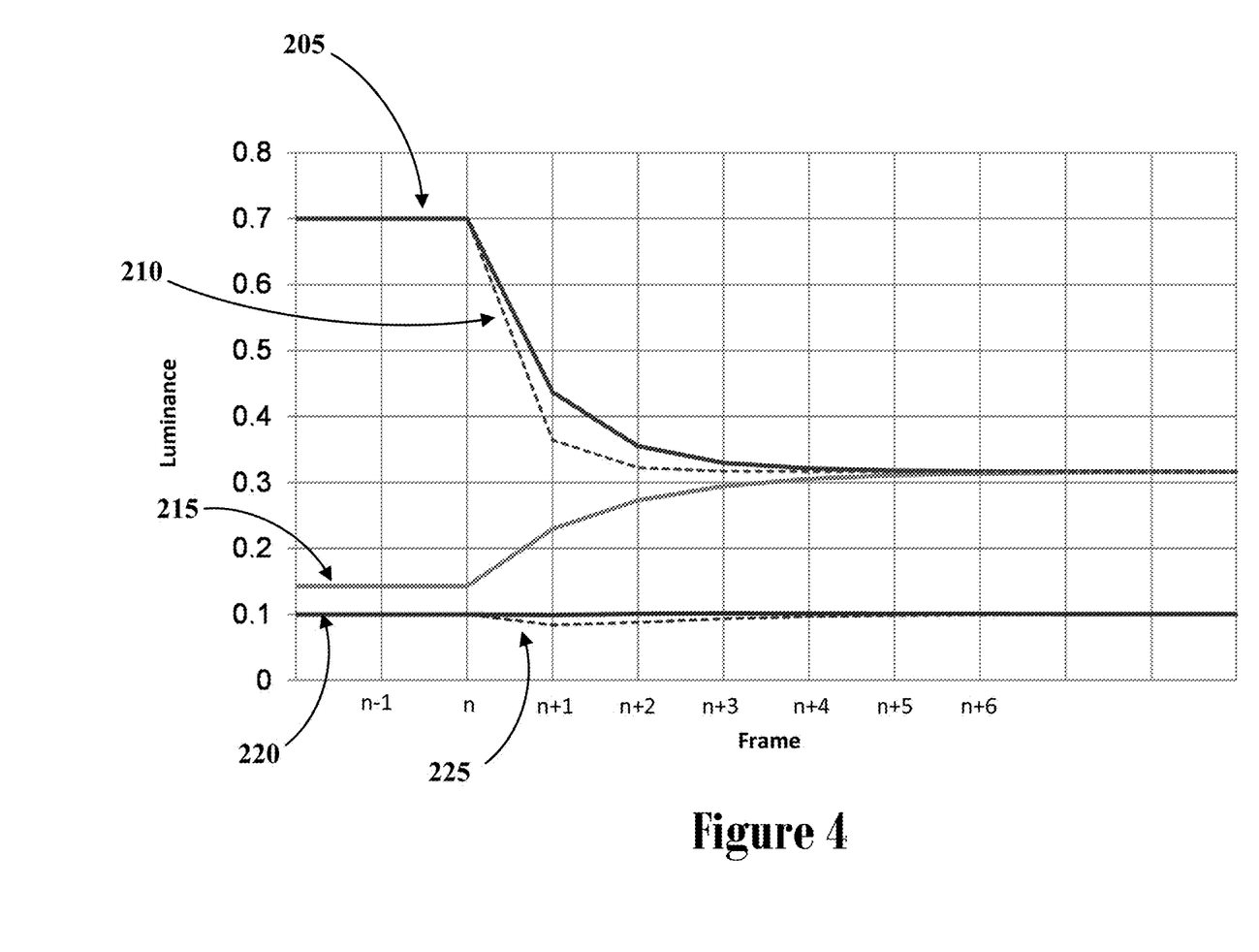
FIG. 4 shows a graph of light filtering by a liquid crystal display device in an embodiment.

FIG. 4 shows a graph of an embodiment of the light filtering for a pixel in the displayed image by the LC display device 1. Solid line 205 is for filtering provided by a pixel in the second display panel 30 without a correction factor CF. Dashed line 210 is for filtering provided by the same pixel in the second display panel 30 when the correction factor CF is being applied by the filter 150. Solid line 215 corresponds to filtering provided by a corresponding pixel in the first display panel 30. Solid line 220 corresponds to the luminescence of the corresponding pixel in the displayed image with the correction factor CF being applied. Dashed line 225 corresponds to the luminescence of the corresponding pixel in the displayed image without the correction factor CF.

For demonstration purposes, relative luminance of the pixel in the displayed image is configured to stay at 0.1 while the filterings provided by the corresponding pixels in the first and second display panels 10, 30 change. As shown in FIG. 4, the pixels in the display panels 10, 30 begin the filtering change on frame n. For example as shown by the dashed line 210, the second display panel 30 take about two frame (i.e., at about frame n+2) to reach its target value (0.33 in this example). For example as shown by the solid line 215, the first display panel 30 takes about 5 frames (i.e., at about frame n+5) to reach its target value (0.33 in this example). As show by the dashed line 225, the luminescence of the pixel in the displayed image deviates from the target value of 0.1 as the filtering changes in the display panels 10, 30, when the corrective factor CF is not being used. This occurs because the second display panel 30 has a faster response speed and therefore decreases its filtering (shown by the dashed line 205) faster than the first display panel 10 increases its filtering (shown by the solid line 215).

As shown by the dashed line 210, the correction factor CF decreases the rate at which the filtering by the pixel in the second display panel 30 changes. The image processor 100 adjusts the second image data $D_2$ so that the pixel in the second display panel 30 more slowly reaches its target value in about 4 frames. The image processor 100 underdrives the faster second display panel 30. Accordingly, the luminescence of the pixel in the displayed image (shown by the solid line 220) stays at 1.0 when the correction factor CF is being applied to the second display panel 30.

Figure 5:
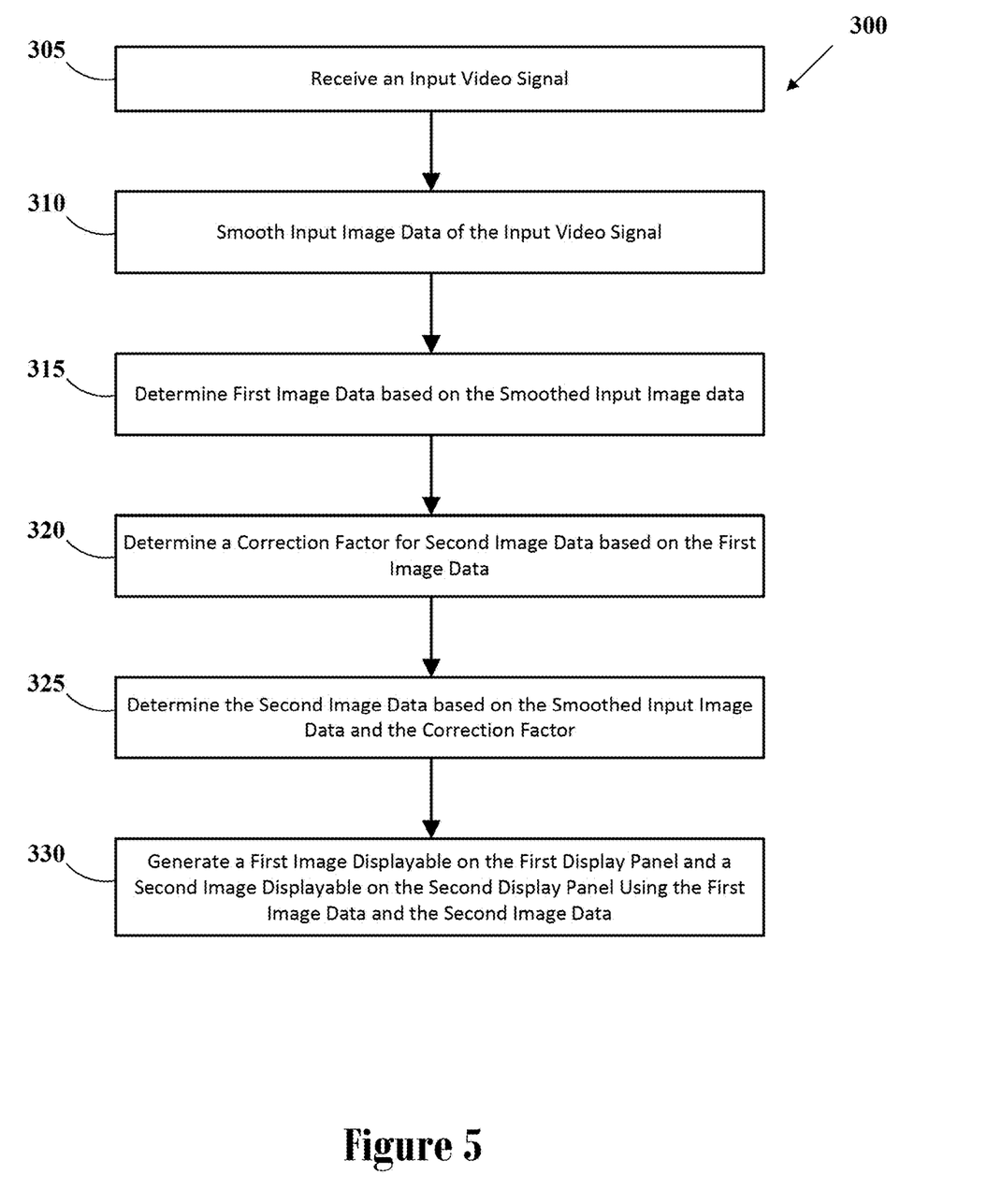
FIG. 5 is a block diagram of a method of displaying an image in a liquid crystal display device.

FIG. 5 is block diagram of an embodiment of a method 300 of displaying an image in a LC display device with at least two display panels. In an embodiment, the method 300 may employed for the LC display device 1 of FIGS. 1-3. The method 300 starts at 305.

At 305, an image processor in the LC display device (e.g., image processor 100) receives an input image data (e.g., input image data $D_i$). The method 300 then proceeds to 310.

At 310, a smoothing processor (e.g., smoothing processor 110) smooths the input image data. In an embodiment, the smoothing 310 includes performing grayscale inversion and one or more type of image smoothing (e.g., max filtering, balance filtering, etc.). In an embodiment, the smoothing processor includes a grayscale inverter (e.g., grayscale inverter 114) for the grayscale inversion and at least one type of smoothing filter (e.g., max filter 112, balance filter 116). The method 300 then proceeds to 315.

At 315, a first image data decision unit (e.g., first image data decision unit 130) determines first image data (e.g., first image data $D_1$) based on the smoothed input image data (e.g., smoothed input image data $D_3$). The image data decision unit is operatively connected to the smoothing processor. The method 300 then proceeds to 320.

At 320, a filter (e.g., filter 150) is used to determine a correction factor (e.g., correction factor CF) for second image data ($D_2$) based on the first image data. The filter is operatively connected to the first image data decision unit. In an embodiment, determining the correction factor 320 includes storing and retrieving image data in a frame memory (e.g., frame memory 156). In an embodiment, determining the correction factor 320 includes looking up values stored in a lookup table.

In an embodiment, determining the correction factor 320 includes comparing one of the first image data in a current frame and the first image data in a previous frame, or the first image data in a current frame and a data calculated in the filter in a previous frame. In such an embodiment, the comparison may be used to generate a grayscale of modified first image data (e.g., grayscale of modified first image data $D_4$), and the determining the correction factor 320 including dividing the grayscale of the modified first image data by a grayscale of the first image data.

In an embodiment, determining the correction factor 320 includes determining an output gradation value based on a relationship between an input gradation value in a current frame and a corrected gradation value in a previous frame.

At 325, a second image data decision unit (e.g., second image data decision unit 140) determines the second image data based on the smoothed input image data and the correction factor. The second image data decision unit is operatively connected to the first image data decision unit and the filter. The method 300 then proceeds to 330.

At 330, the image processor generates a first image displayable on the first display panel and a second image displayable on the second display panel using the first image data and the second image data.

In an embodiment, the method 300 may be modified to have features as discussed herein. For example, the method 300 in an embodiment may be modified based on display device 1 and/or the image processor 100 as shown in FIGS. 1-3 and described above.

The examples disclosed in this application are to be considered in all respects as illustrative and not limitative. The scope of the invention is indicated by the appended claims rather than by the foregoing description; and all changes which come within the meaning and range of equivalency of the claims are intended to be embraced therein.

What is claimed is:

1. A liquid crystal display device, comprising:
   a first display panel that displays a first image;
   a second display panel that displays a second image and that is opposed to the first display panel; and
   an image processor that generates first image data corresponding to the first image and second image data corresponding to the second image based on an input image data,
   wherein the image processor includes:
      a smoothing processor that performs smoothing processing on the input image data;
      a first image data decision unit operatively connected to the smoothing processor and that decides the first image data based on the input image data subjected to the smoothing processing;
      a filter operatively connected to the first image data decision unit that decides a correction factor for the second image data based on the first image data; and
      a second image data decision unit operatively connected to the smoothing processor and the filter, the second image data decision unit decides the second image data based on the input image data subjected to the smoothing processing and the correction factor from the filter,
   wherein the first display panel includes liquid crystal and the second display panel includes liquid crystal, wherein response speeds of the first and second display panels are based on the liquid crystal in each of the first and second display panels, and
   wherein the response speed of the second display panel is faster than the response speed of the first display panel, and the image processor underdrives the second display panel such that the liquid crystal in the second display panel is operated to respond more slowly, or
      the response speed of the second display panel is slower than the response speed of the first display panel, and the image processor overdrives the second display panel such that the liquid crystal in the second display panel is operated to respond more quickly.

2. The liquid crystal display device according to claim 1, wherein the filter compares the first image data in a current frame and the first image data in a previous frame, or the first image data in a current frame and a data calculated in the filter in a previous frame, to decide the correction factor for the second image data.

3. The liquid crystal display device according to claim 1, wherein the filter includes a frame memory to store data calculated in the filter.

4. The liquid crystal display device according to claim 1, wherein the filter includes:
   a temporal filter that compares the first image data in a current frame and the first image data in a previous frame, or the first image data in a current frame and data calculated in the filter in a previous frame, and generates a grayscale of modified first image data; and
   a divider that calculates a correction amount of the correction factor by dividing the grayscale of the modified first image data by a grayscale of the first image data.

5. The liquid crystal display device of claim 1, wherein the filter utilizes values stored in a lookup table.

6. The liquid crystal display device of claim 1, wherein the filter determines an output gradation value based on a relationship between an input gradation value in a current frame and a corrected gradation value in a previous frame.

7. A method for displaying an image in a liquid crystal display device having first and second display panels, comprising:
   receiving, by an image processor, input image data;
   smoothing, by a smoothing processor, the input image data;
   determining, by a first image data decision unit operatively connected to the smoothing processor, first image data based on the smoothed input image data;
   determining a correction factor, using a filter operatively connected to the first image data decision unit, for second image data based on the first image data;
   determining, by a second image data decision unit operatively connected to the first image data decision unit and the filter, the second image data based on the smoothed input image data and the correction factor; and
   generating, by the image processor, a first image displayable on the first display panel and a second image displayable on the second display panel using the first image data and the second image data,
   wherein the first display panel includes a liquid crystal and the second display panel includes a liquid crystal,
   wherein response speeds of the first and second display panels are based on the liquid crystal in each of the first and second display panels, and
   wherein the response speed of the second display panel is faster than the response speed of the first display panel, and the image processor underdrives the second display panel such that the liquid crystal in the second display panel is operated to respond more slowly, or
      the response speed of the second display panel is slower than the response speed of the first display panel, and the image processor overdrives the second display panel such that the liquid crystal in the second display panel is operated to respond more quickly.

8. The method of claim 7, wherein the determining the correction factor includes comparing the first image data in a current frame and the first image data in a previous frame, or the first image data in a current frame and a data calculated in the filter in a previous frame, to decide the correction factor for the second image data.

9. The method of claim 7, wherein the determining the correction factor includes storing and retrieving image data in a frame memory.

10. The method of claim 7, wherein the determining the correction factor includes:
    comparing the first image data in a current frame and the first image data in a previous frame, or the first image data in a current frame and data calculated in the filter in a previous frame, and generates a grayscale of modified first image data; and
    dividing the grayscale of the modified first image data by a grayscale of the first image data.

11. The method of claim 7, wherein the determining the correction factor includes looking up values stored in a lookup table.

12. The method of claim 7, wherein the determining the correction factor includes determining an output gradation value based on a relationship between an input gradation value in a current frame and a corrected gradation value in a previous frame.

* * * * *